United States Patent [19]

Meuschke et al.

[11] Patent Number: 5,687,207
[45] Date of Patent: Nov. 11, 1997

[54] REFUELING MACHINE

[75] Inventors: Robert E. Meuschke, Monroeville; Louis J. Malandra, McKeesport, both of Pa.

[73] Assignee: Westinghouse Electric Corporation, Pittsburgh, Pa.

[21] Appl. No.: 627,747

[22] Filed: Apr. 2, 1996

[51] Int. Cl.[6] ............................................. G21C 19/20
[52] U.S. Cl. ........................... 376/264; 376/271; 376/253
[58] Field of Search ................................. 376/264, 268, 376/271, 262, 253, 251; 294/906

[56] References Cited

U.S. PATENT DOCUMENTS

| | | | |
|---|---|---|---|
| 4,053,067 | 10/1977 | Katz et al. | 376/268 |
| 4,158,599 | 6/1979 | Andrews et al. | 376/262 |
| 4,269,660 | 5/1981 | Neuenfield et al. | 376/271 |
| 4,308,100 | 12/1981 | Albin | 376/271 |
| 4,311,557 | 1/1982 | Kowalski et al. | 376/271 |
| 4,427,623 | 1/1984 | Howard et al. | 376/271 |
| 4,463,867 | 8/1984 | Hornak et al. | 376/248 |
| 4,511,531 | 4/1985 | Swidwa et al. | 376/271 |
| 4,647,424 | 3/1987 | Meuschke et al. | 376/264 |
| 4,781,882 | 11/1988 | Salton et al. | 376/271 |
| 4,788,028 | 11/1988 | Leclerco et al. | 376/264 |
| 4,824,633 | 4/1989 | Icikawa et al. | 376/271 |
| 4,832,902 | 5/1989 | Kaufmann et al. | 376/268 |
| 5,383,226 | 1/1995 | Deleryd et al. | 376/253 |

*Primary Examiner*—Daniel D. Wasil

[57] ABSTRACT

A refueling machine for refueling a pressurized water reactor has a trolley which travels on rails mounted on a transversely movable bridge. The trolley supports a refueling mast which includes an outer mast and two horizontally spaced apart, vertically movable gripper masts disposed within the outer mast. This design permits the machine to safely handle two fuel assemblies simultaneously in order to substantially reduce refueling critical path time. The two gripper masts can be raised, lowered and otherwise operated independently of each other. A partition plate extending through the stationary mast between the two movable gripper masts permits each fuel assembly held in the refueling mast to be independently leak tested.

6 Claims, 3 Drawing Sheets

REFUELING MACHINE

BACKGROUND OF THE INVENTION

The invention relates to a refueling machine for transferring fuel assemblies between a nuclear reactor vessel and a fuel pit and, more particularly, to a refueling machine for transferring more than one fuel assembly at a time.

Reactor vessels in commercial four loop pressurized water reactors (PWRs) commonly have up to about 190 or more fuel assemblies in their cores. In addition, an advanced reactor design has over 250 fuel assemblies in the reactor core. Each of the fuel assemblies in a core of a commercial power reactor is normally replaced or shuffled every year and a half to two years during scheduled refueling outages. During an outage, up to about a third or more of the fuel assemblies then in the reactor core are removed to a spent fuel pit for eventual disposal as spent fuel. These spent fuel assemblies then are replaced by fresh assemblies. The other fuel assemblies remaining in the core are moved to different positions in order to maximize the power output of the core during the next fuel cycle with an optimum utilization of energy contained in the nuclear fuel.

The fuel assemblies are transferred to and from the reactor vessels by refueling machines such as the machines disclosed by U.S. Pat. Nos. 4,311,557 to Kowalski et al., 4,824,633 to Ichikawa et al. and 5,383,226 to Deleryd et al. Typically, a refueling machine has a gripper unit which suspends the fuel assembly while it is being transferred. An underwater camera unit attached to the refueling machine may be employed to inspect the gripper unit and/or the suspended fuel assembly. These refueling machines transfer the fuel assemblies to and from upenders associated with fuel transfer units located in refuelling canals for transferring the fuel assemblies to and from fuel pits located outside of the containment. The fuel assemblies are in turn transferred to and from similar upenders in the fuel pits associated with fuel handling machines which transfer the assemblies to and from racks or casks in the fuel pits. See, e.g., U.S. Pat. No. 4,158,599 to Andrews et al.

Refueling a commercial nuclear reactor normally requires up to several weeks and, in some cases, even months to complete. Accordingly, the nuclear power industry desires to safely perform as many refueling operations in parallel as possible in order to shorten the refueling time. Thus, for example, the above-identified U.S. Pat. No. 4,824,633 proposes to refuel a reactor plant using two independently movable, computer-operated carrier devices with each carrier device having its own gripper unit. However, the simultaneous horizontal movement of two carriers in the limited space between the reactor vessel and the fuel transfer units in the refueling canal must be very carefully controlled for safe operation.

The nuclear power industry has not heretofore developed a more practical, efficient means for safely handling more than one fuel assembly at a time around a reactor vessel during a refueling operation.

SUMMARY OF THE INVENTION

It is an object of the present invention to provide a refueling machine for safely handling more than one fuel assembly at a time in the vicinity of a reactor vessel during a refueling operation. It is a further object to provide a refueling machine having a carrier for supporting a plurality of gripping units for simultaneously handling more than one fuel assembly.

With these objects in view, the present invention resides in a refueling machine which has a trolley supporting a refueling mast and two horizontally spaced apart, vertically movable gripper masts disposed within the refueling mast. Advantageously, more than one fuel assembly can be suspended from the one outer mast and simultaneously transferred between a reactor vessel and a fuel tranfer machine. This will reduce the time required for fuel assembly handling activities by up to about 30% or more as compared with a conventional refueling machine having one gripper unit.

BRIEF DESCRIPTION OF THE DRAWINGS

The invention as set forth in the claims will become more apparent from the following detailed description of a preferred embodiment thereof shown, by way of example only, in the accompanying drawings, wherein:

DESCRIPTION OF THE PREFERRED EMBODIMENT

Figure 1:
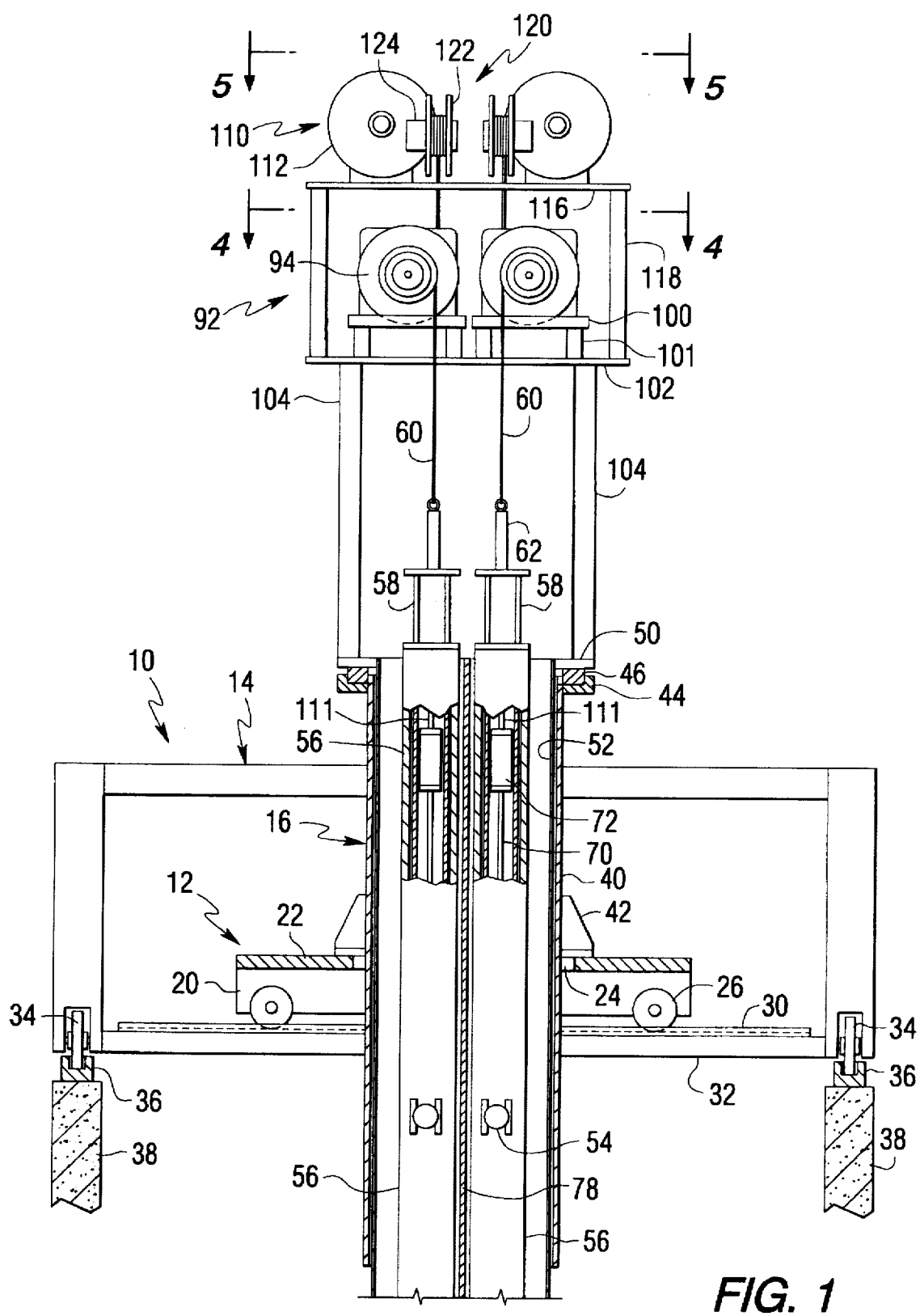
FIG. 1 is a front view of the upper half of a refueling machine embodying the present invention.
Figure 2:
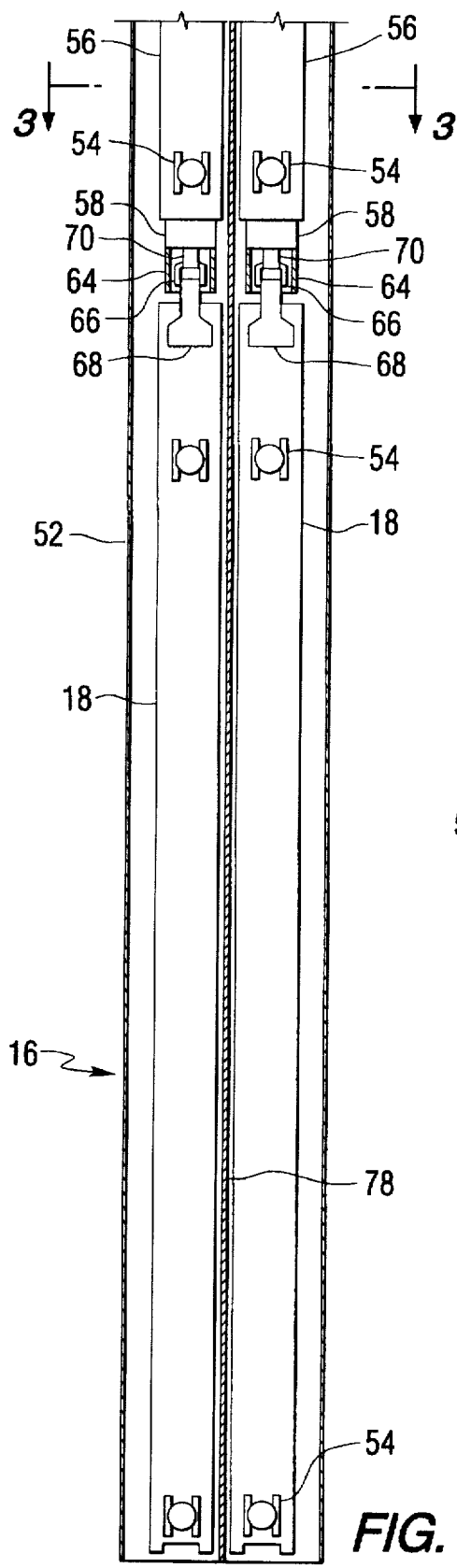
FIG. 2 is a front view of the lower half of the refueling machine of FIG. 1.

Briefly, and referring now to the drawings and in particular to FIGS. 1 and 2, there is shown a refueling machine 10 of the type disclosed by U.S. Pat. No. 4,311,557 to Kowalski et al. and U.S. Pat. No. 4,511,531 to Swidwa et al., which are incorporated by this reference for their detailed disclosures of the structure and operation of refueling machines. The refueling machine 10 generally includes a trolley 12 which runs on a traveling bridge 14. The trolley 12 and bridge 14 horizontally move over a reactor vessel and an upender (not shown) to position a refueling mast 16 suspended from the trolley 12 over the appropriate locations for handling particular fuel assemblies 18. As shown in FIGS. 1 and 2, the fuel assemblies 18 are retracted into the refueling mast 16. In another embodiment of the refueling machine, the refueling mast 16 also may be designed to handle control rod assemblies or thimble assemblies.

The trolley 12 generally has a frame 20 supporting a deck 22 having a large opening 24. The trolley 12 has wheels 26 which travel on rails 30 on a transversely movable bridge 32. The bridge 32 has wheels 34 which travel on rails 36 supported on opposite walls 38 of a reactor containment and which span the complete width of a reactor vessel (not shown) located therebeneath.

As shown in FIG. 1, the refueling mast 16 is vertically suspended in the trolley deck opening 24. The refueling mast 16 includes a support tube 40 supported on the trolley deck 22 by brackets 42, which may be bolted or welded to the deck 22. The support tube 40 has an upper flange 44 which supports an intermediate gasket 46 and an upper flange 50 of an outer mast 52. The outer mast 52 of FIG. 1 does not move relative to the trolley 12. In another refueling machine design, the gasket 46 may be replaced with a race 46 for rotatably supporting the outer mast 52. The outer mast 52 has several rows of roller assemblies 54 along its peripheral surface for laterally supporting two spaced apart, vertically movable, guide frames 56 and their cooperating gripping masts 58, which are telescopingly suspended within the outer mast 52 from hoist cables 60 via yokes 62. Advantageously, each guide frame 56 and gripper mast 58 may be raised, lowered and otherwise operated independently of the other to handle fuel assemblies 18 as described in greater detail by the above-referenced U.S. Pat. No. 4,311,557 to Kowalski et al. and U.S. Pat. No. 4,511,531 to Swidwa et al. As is shown in FIG. 2, each gripper mast 58 has a bottom mounted gripper housing 64 containing pneumatically operated gripper fingers 66 for gripping top nozzles 68 of the fuel assemblies 18. The gripper fingers 66 can be operated by an actuator rod 70 extending from an air cylinder 72 in the gripping mast 58.

In a preferred embodiment of the present invention, a partition plate 78 divides the outer mast 52 into two compartments with one cooperating guide frame 56 and gripper mast 58 disposed in each compartment. Advantageously, the partition plate 78 permits each fuel assembly 18 to be independently leak tested in the fully retracted position shown in FIGS. 1 and 2 by in-mast sipping. Leak testing of a fuel assembly 18 is feasible in a fully retracted position because the elevational difference of a fuel assembly 18 between its retracted position relatively near the surface of the refueling water and its in-core position deeper in the refueling water (which is equivalent to approximately 15 psi pressure differential) is sufficient to cause some of the gases in the fuel rods to leak through cracks or pin holes, if any. See, in this regard, U.S. Pat. No. 5,383,226 to Deleryd et al. for a discussion of in-mast sipping.

Figure 3:
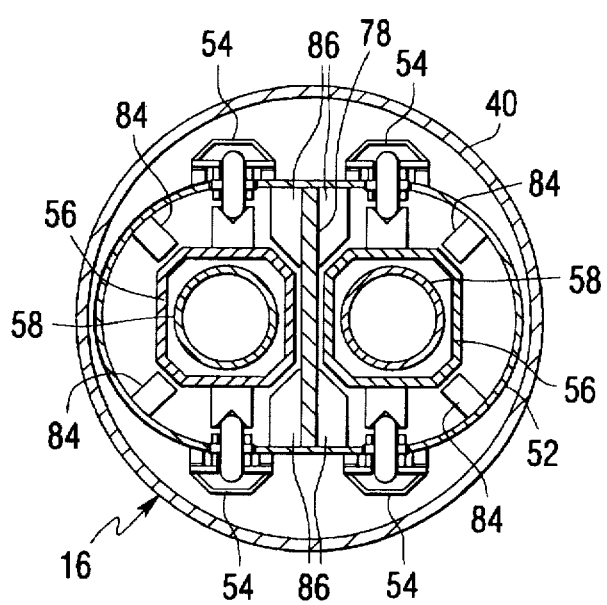
FIG. 3 is a plan view of the refueling machine of FIGS. 1 and 2 taken along section line 3—3 of FIG. 2.

As FIG. 3 shows, the guide frames 56 may have a generally rectangular shape. Each guide frame 56 is laterally supported by roller assemblies 54, which have rollers for engaging the opposite walls of the frame 56. In addition, intermediate adjustable outer guide assemblies 84 and inner guide assemblies 86 are closely spaced from the flat corners of the frame 56 for restricting lateral movement of the frame 56. The guide assemblies 84 and 86 generally have a frame-stop member extending from a threaded shank, which extends from a threaded U-bracket welded to the outer peripheral surface of the outer mast 52. See, in this regard, U.S. Pat. No. 4,311,557 to Kowalski et al. In addition, the inner guide assemblies 86 are preferably supported by the partition plate 78. In another design (not shown), roller assemblies may engage the corners of the frame, and the guide assemblies may oppose the sides of the frame. In addition, the roller assemblies 54 may be sealed with covers welded to the outer peripheral surface of the outer mast 52 to prevent inleakage of refueling water from the outside the outer mast 52 into the compartment during in-mast sipping operations.

Figure 4:
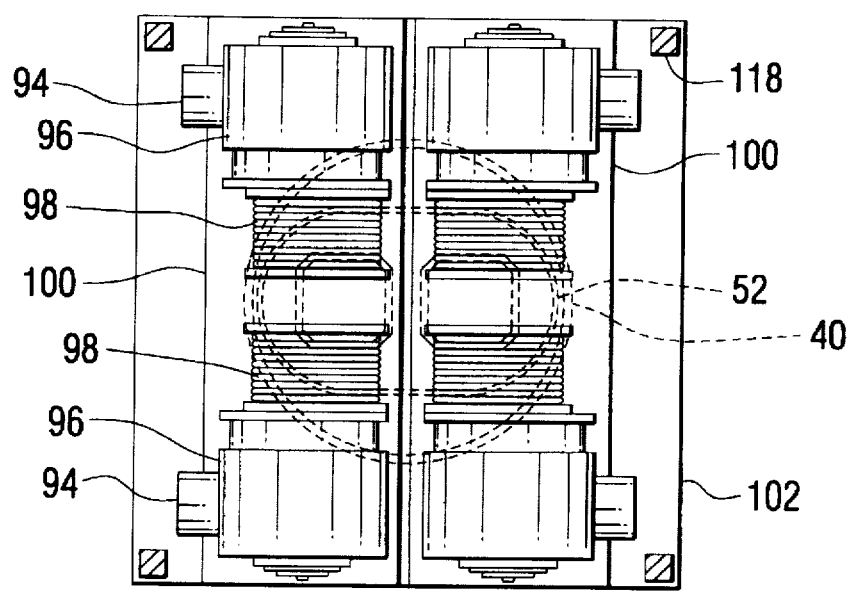
FIG. 4 is a plan section view of the refueling machine of FIGS. 1 and 2 taken along section line 4—4 of FIG. 1.

As FIGS. 1 and 4 generally show, the hoist cable 60 may be operated by a winch assembly 92 which generally includes a motor 94, speed reducer 96 and reel 98. FIG. 4 shows two winch assemblies 92 associated with each telescoping guide frame 56 and gripper mast 58. Each winch assembly 92 of a pair operates a separate cable 60 and the two cables 60 are connected to one yoke 62 in order to raise or lower a guide frame 56 and gripper mast 58. Each pair of winch assemblies 92 are mounted on a platform 100 having legs 101 removably attached to a frame 102, which in turn is supported on brackets 104 above outer mast ring 50.

Figure 5:
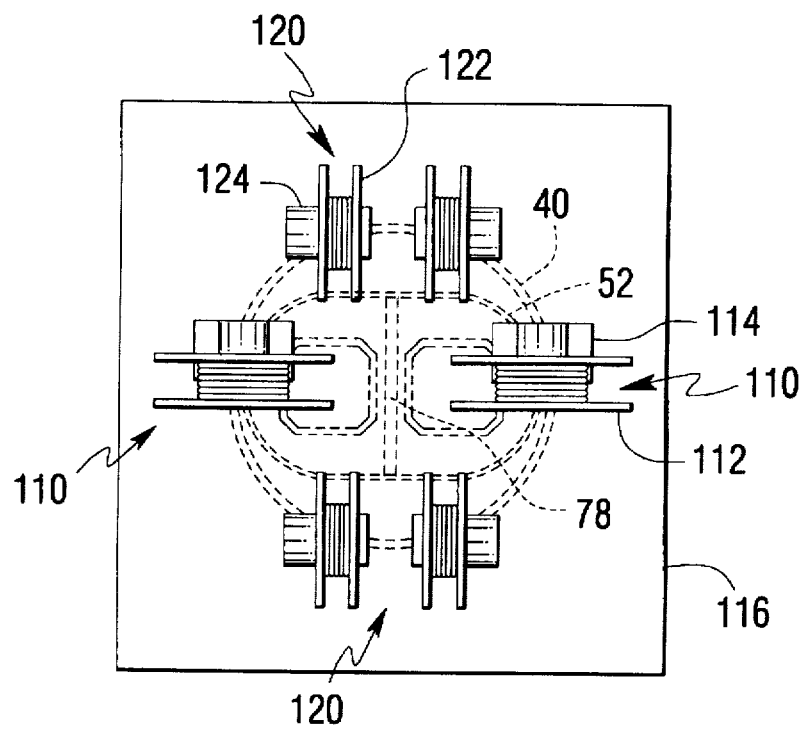
FIG. 5 is a plan section view of the refueling machine of FIGS. 1 and 2 taken along section line 5—5 of FIG. 1.

As FIGS. 1 and 5 generally show, air hose reel assemblies 110 may be employed to pay out air hoses 111 for actuating the gripper the air cylinders 72 located in the gripper masts 52 to operate the gripper fingers 66. Each assembly 110 generally includes a reel 112 operated by a motor 114. The reel assemblies 110 are supported on a platform 116, which in turn is supported above the winch assemblies 92 by brackets 118 attached to the winch assembly frame 102. The platform 116 may also support electric reels assemblies 120, including reels 122 and motors 124, for television camera, lights and the like(not shown). See, for example, U.S. Pat. No. 4,643,867 to Hormak et al. for a discussion of a camera unit which may be used during a refueling operation to inspect the nozzle of a fuel assembly 18.

During a refueling operation, the refueling machine 10 is positioned over a first fuel assembly 18 in a reactor vessel. One gripper mast 56 may then be lowered, attached to the assembly 18 and retracted into the outer mast 52. The refueling machine 10 may then be repositioned over an adjacent fuel assembly 18 and the second gripper mast 56 then lowered, attached to a second assembly 18 and retracted into the second compartment of the outer mast 52. The two fuel assemblies may then be transported to an upender (not shown) and loaded on the upender for removal from the containment. Advantageously, both fuel assemblies 18 in one refueling mast 16 can be safely loaded on an upender simultaneously. Fuel assembly shuffling and reloading operations may be accomplished by similar steps.

While a present preferred embodiment of the present invention has been shown and described, it is to be understood that the invention may be otherwise variously embodied within the scope of the following claims of invention.

What is claimed is:

1. A method of refueling a nuclear reactor vessel, comprising the steps of:

(a) positioning a refueling mast over a first fuel assembly in a reactor vessel;

(b) extending a first gripper mast within the refueling mast toward the fuel assembly;

(c) attaching the fuel assembly to the first gripper mast;

(d) retracting the first fuel assembly into the refueling mast;

(e) repositioning the refueling mast over a second fuel assembly in the reactor vessel;

(f) extending a second gripper mast within the refueling mast toward the second fuel assembly;

(g) attaching the second fuel assembly to the second gripper mast; and (h) retracting the second fuel assembly into the refueling mast.

2. The method of claim 1, including the step of: leak testing one of the fuel assemblies without leak testing the second fuel assembly while both fuel assemblies are retracted into the refueling mast.

3. The method of claim 1, including the step of: leak testing both of the fuel assemblies while both fuel assemblies are retracted into the refueling mast.

4. The method of claim 1, including the step of: simultaneously unloading both of the retracted fuel assemblies from the refueling mast.

5. The method of claim 1, including the steps of: unloading the retracted fuel assemblies from the refueling mast; and then simultaneously loading two other fuel assemblies into the refueling mast.

6. The method of claim 1, including the step of: placing the two fuel assemblies retracted into the refueling mast in different locations in the reactor vessel.

* * * * *